United States Patent
Benardeau

(10) Patent No.: US 6,813,709 B1
(45) Date of Patent: Nov. 2, 2004

(54) METHOD AND APPARATUS FOR RECORDED DIGITAL DATA PROTECTION VIA MEDIA VOLUME

(75) Inventor: Christian Benardeau, Bussy Saint Georges (FR)

(73) Assignee: Canal+ Societe Anonyme, Paris (FR)

( * ) Notice: Subject to any disclaimer, the term of this patent is extended or adjusted under 35 U.S.C. 154(b) by 0 days.

(21) Appl. No.: 09/534,181

(22) Filed: Mar. 24, 2000

Related U.S. Application Data

(63) Continuation of application No. PCT/IB98/01510, filed on Sep. 22, 1998.

(30) Foreign Application Priority Data

Sep. 25, 1997 (EP) .............................................. 97402237

(51) Int. Cl.$^7$ .............................................. G06F 12/14
(52) U.S. Cl. ........................ 713/172; 713/172; 713/200; 705/55; 705/56; 705/57
(58) Field of Search ................................ 713/190–202; 705/55–58; 369/59.25

(56) References Cited

U.S. PATENT DOCUMENTS

| | | | | |
|---|---|---|---|---|
| 4,827,508 A | * | 5/1989 | Shear ............................ | 705/53 |
| 5,007,082 A | * | 4/1991 | Cummins ..................... | 713/164 |
| 5,058,162 A | | 10/1991 | Santon et al. ................. | 380/25 |
| 5,191,611 A | | 3/1993 | Lang ............................ | 380/25 |
| 5,212,729 A | * | 5/1993 | Schafer ......................... | 705/55 |
| 5,224,166 A | | 6/1993 | Hartman, Jr. ................. | 380/50 |
| 5,495,531 A | * | 2/1996 | Smiedt .......................... | 705/59 |
| 5,546,463 A | * | 8/1996 | Caputo et al. ............... | 713/159 |
| 5,557,674 A | * | 9/1996 | Yeow ........................... | 713/193 |
| 5,666,411 A | | 9/1997 | McCarty ........................ | 380/4 |
| 5,905,798 A | * | 5/1999 | Nerlikar et al. ................ | 705/57 |
| 2001/0032088 A1 | * | 10/2001 | Utsumi et al. .................. | 705/1 |

OTHER PUBLICATIONS

Microsoft Press, Computer Dictionary, 3rd edition, 1997, p. 196, file system definition, p. 189, FAT file definition.*
Langer, Reuven, "Hide–Files" (Readme.txt from hided302.zip), R.E.L. Data services, Dec. 15, 1997 (http://www.bookcase.com/library/software/msdos.security.undef.html.*

\* cited by examiner

*Primary Examiner*—Ayaz Sheikh
*Assistant Examiner*—Ronald Baum
(74) *Attorney, Agent, or Firm*—Osha & May L.L.P.

(57) ABSTRACT

A method of restricting access to recorded digital data on a digital support medium (2) using an integrated circuit e.g. on a smart card (4) containing a first decryption key (Kf) characterized in encrypting with a corresponding encryption key (Kf) one or more elements of the volume descripter (V) of the support medium (2), recording the encrypted elements of the volume descripter together with non-encrypted data on the support medium and, when accessing the support medium (2), using the integrated circuit decryption key (Kf) to decrypt the encrypted elements of the volume descripter (V) and to supply a reader (5) with these elements so as to permit the reading and/or writing of non-encrypted data on the support medium (2).

16 Claims, 2 Drawing Sheets

METHOD AND APPARATUS FOR RECORDED DIGITAL DATA PROTECTION VIA MEDIA VOLUME

Figure 1:
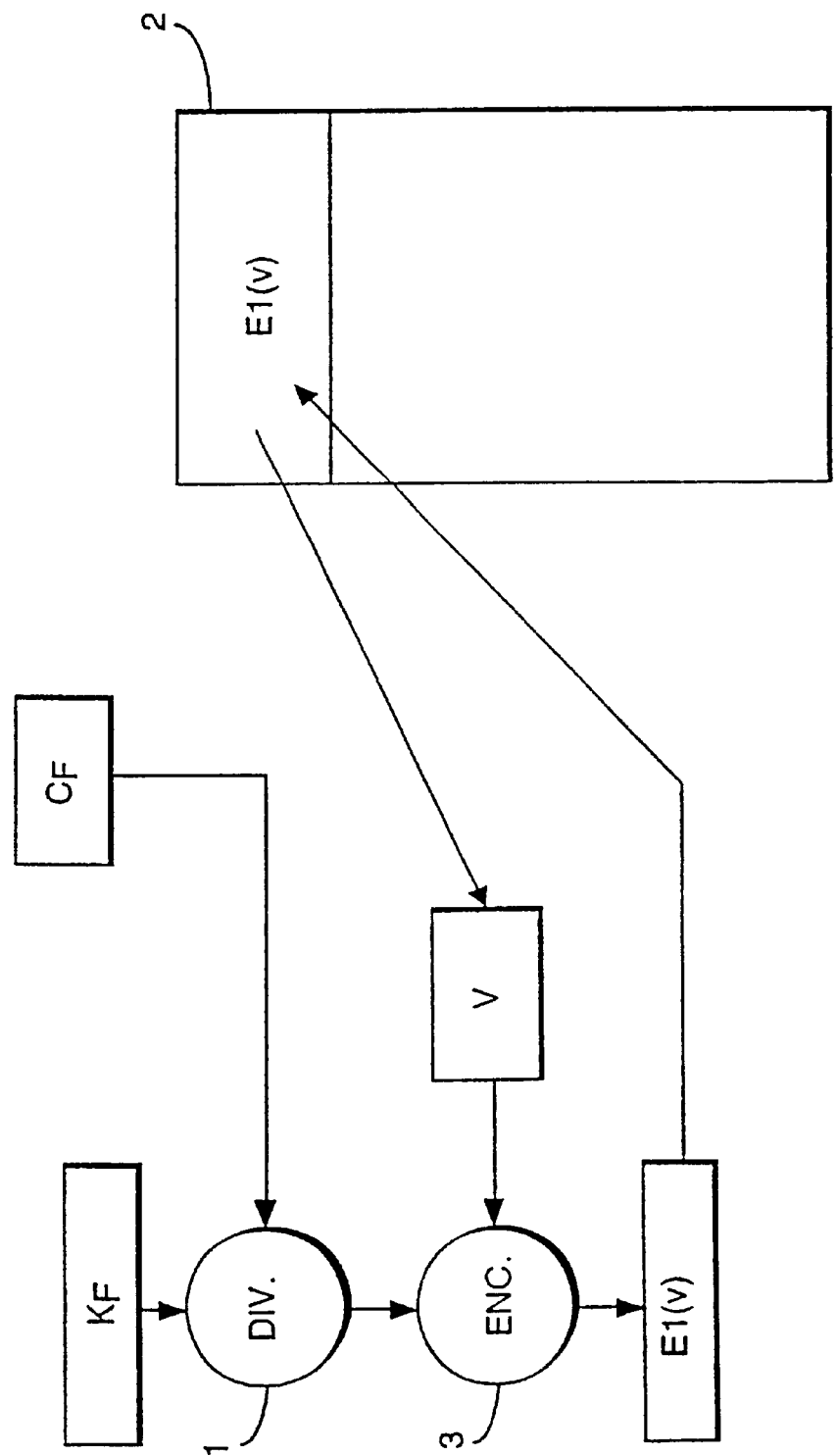

This is a continuation of International Application PCT/IB98/01510, with an international filing date of Sep. 22, 1998.

The present invention relates to a method and apparatus for protection of recorded digital data, for example protection of audio and/or visual data as recorded on compact disks, digital video disks or other similar supports.

The introduction of digital technology in the audiovisual field has brought considerable advantages to the consumer in comparison with analog technologies, notably in relation to the quality of reproduction of sound and image and the durability of the support medium. The compact disk has all but replaced traditional vinyl records and a similar trend is expected with the introduction of new digital products aimed at the multimedia and home entertainment markets generally. notably the digital video disk.

A particular problem associated with digitally recorded data lies in its ease of reproduction and the possibilities for piracy that arise therefrom. A single digital recording may be used to make any number of perfect copies without any degradation in the quality of the sound or image. This problem is serious, particularly with the advent of recordable digital products such as the minidisk or DAT, and the reluctance of entertainment companies to license copyright works whilst this problem remains has acted as a break on the introduction into the market of new media products.

At present, the only practically available solution against unauthorized reproduction of copyright works has been a legal one, and a number of countries in Europe and elsewhere have introduced anti-piracy legislation to combat the increasing number of pirate films, CDs etc being brought onto the market. For obvious reasons, a legal solution is less than optimal from the point of view of preventative action.

Technological anti-copying solutions proposed to date for audiovisual works have been extremely basic, relying for example on the idea of using some form of digital <<handshake>> between the reader and support medium so as to verify the origin of the the recording. Such protection is, however, only effective against only the most low level of copying activity, since the handshake signal is not protected in any way and may be easily read and reproduced so as to convert an unauthorised copy into an apparently authorised and readable copy.

Computer systems using secret keys stored in a smart card to control access to encrypted computer disk data are known, for example, from U.S. Pat. No. 5,191,611. Such systems possess the disadvantage that the reader needs to be provided with considerable processing and memory capabilities in order to decrypt and store the recorded encrypted blocks of data. As will be understood, such systems are generally inconvenient when used to protect computer data and are even more unsuitable for application in the audiovisual domain, where a reader device typically has a much smaller capacity to process and store data in comparison with a computer, but where a real-time flow of data needs nevertheless to be maintained.

The aim of the present invention is to overcome the disadvantages associated with the prior art techniques and to provide an efficient technological solution against the unauthorised reproduction of digitally recorded copyright works, particularly in relation to audiovisual works.

According to the present invention there is provided a method of restricting access to recorded digital data on a digital support medium using an integrated circuit containing a first decryption key characterized in encrypting with a corresponding encryption key one or more elements of the volume descripter of the support medium, recording the encrypted volume descripter elements together with non-encrypted data on the support medium and, when accessing the support medium, using the integrated circuit decryption key to decrypt the encrypted elements of the volume descripter and to supply a reader with these elements so as to permit the reading and/or writing of non-encrypted data on the support medium.

For digital support mediums, such as CDs, CD ROMs, etc., each recording has associated therewith an introduction or header in the form of a volume descriptor which sets out basic information regarding the storage layout and points of access of digital information in the medium, the amount of data stored in the medium, the date of creation of the support medium etc. This information, which occupies only a small amount of memory, is nevertheless essential to the reading of the recording and, without this information the reader cannot access the recorded data.

By encrypting this information and storing the decryption key in an integrated circuit associated with the support medium, the present invention protects against unauthorised copying of the recording, since the reader will not be able to access the stored data without the decrypted elements of the volume descripter and since the key necessary to do this is held by the integrated circuit, which is of course resistant to copying. Even if the stored non-encrypted data is copied, the resulting copy will be unreadable since the volume descripter will only be present in an incomplete or entirely encrypted form. The decryption of the volume elements may be carried out inside the integrated circuit, such that the key is never made freely available.

Unlike the prior art technique used for protecting computer data, only the volume descripter or header data is encrypted/decrypted, avoiding the need to carry out cryptographic operations on the entire volume of stored data. As will be understood, this is particularly advantageous where the invention is to be applied to the field of audiovisual devices, where the processing and memory capacity of a reader may be relatively small.

In one embodiment, the integrated circuit is embedded in a smart card associated with the support medium, the smart card acting to decrypt the encrypted volume elements and to pass these to the reader so as to permit reading and/or writing of the recorded non-encrypted data.

In this context, a smart card provides a secure and durable means for stocking the key necessary for decryption of the volume descripter elements. Equally, the cost of production of such a card is relatively small in comparison with, for example, the price of the recording itself.

In this application the term <<smart card>> is used to mean any conventional chip-based card device possessing, for example, microprocessor or EEPROM memory for stocking the key. Also included in this term are PCMCIA cards and other portable chip carrying cards or devices having alternative physical forms, such as the key-shaped devices often used in TV decoder systems.

Whilst providing a particularly convenient way of housing the integrated circuit or <<chip>> used in the invention, a smart card is not the only solution available. For example, in one realisation, the key is stored in an integrated circuit embedded in the housing of the digital support medium. Incorporation of a microprocessor within the housing of the support medium is a known technique and has been suggested, for example, in the case of DVHS cassettes where a set of metallic contacts may be provided on an exterior surface of the cassette housing, the contacts leading to an integrated circuit or chip in the interior of the housing. These contacts may be engaged by a corresponding set of contacts in the receptacle of the recorder to enable communication between the integrated circuit and the video recorder.

Such a solution avoids the need for the provision of a smart card or the like in conjunction with the recording and is thus inherently simpler from the point of view of the consumer. The need to include, for example, a smart card slot in the digital reader is also avoided, although the cost of production of the recording medium will of course increase to incorporate the introduction of an integrated circuit in the housing, as may the costs of the elements of the reader used to read the support In one embodiment the key for encrypting and/or decrypting the volume descripter elements comprises a key diversified by a manufacturing constant representing a value associated with the identity of the support medium or the recorded data, for example a serial or batch number. In this way a simple encryption algorithm can be used, diversified by the manufacturing constant, to provide a <<unique>> key and a unique encrypted volume descripter. In fact, for most practical purposes, the same key may be generated for a given batch of recording supports or for one particular recorded performance.

In its simplest form the key algorithm used in this invention can be any one of a number of known symmetric algorithms, such as DES or RC2 etc. In such a case, the encryption/decryption keys can be thought of as identical. Other embodiments are possible, using public/private key pairs, for example.

In one realisation of the method of the invention, the volume elements are re-encrypted by the integrated circuit according to a new key generated and stored in the integrated circuit, the re-encrypted volume elements being thereafter recorded on the medium by the reader, replacing the previously encrypted values. In this way, the security of the system is increased and the identification of the integrated circuit with the recording in question assured.

The new key may be generated by the integrated circuit using a random or pseudo-random number generator, for example. Thus, even in the case of a batch of recordings initially encoded with the same key, the encrypted volume descripter will quickly mutate with each playing of the recording, such that no two recordings will open with the same key.

In one embodiment, the new key generated by the integrated circuit is diversified by a value associated with the identity of the reader, for example its serial number, read by the integrated circuit from the reader. This permits the recording only to be read by that particular reader.

In one embodiment, the value associated with the identity of the reader is stored in the support medium and compared by the integrated circuit with the value read directly from the reader on subsequent readings. In one realisation, the integrated circuit may simply reject the value read from the reader if this does not match that stored in the medium.

However, in an alternative realisation, the system may be programmed to allow an update of this value to allow, for example, for the possibility that the reader has been replaced or broken down. In such an embodiment, the integrated circuit compares the identity value read from the support medium with that read from the reader and, in the event of a mismatch or difference between the two, acts to decrypt the volume elements using the previous reader identity value from the recording medium and thereafter to re-encrypt the volume elements using the new reader identity value from the reader.

The new reader identity can either replace or be stored together with the previous reader identity. In the former case, in order to prevent an unlimited number of readers from accessing the disk, the integrated circuit can be programmed to carry out this operation only a predetermined number of times. In the latter case, the integrated circuit can be programmed to permit a predetermined number of authorised reader identities to be stored, so as to allow the recording to be played on a number of readers belonging to the user, for example. With a limited number of reader identities, the integrated circuit can safely permit an unlimited number of changes between the authorised readers.

The present invention has been described above largely in relation to the protection of pre-recorded recordings, such as pre-recorded CDs, CD ROMs etc. However, as will be appreciated, the same technique can be applied to blank recordable units and in one realisation the support medium is blank prior to its first insertion in the reader, the presence of the associated integrated circuit being necessary in order to decrypt the volume elements before the reader is allowed to write any data onto the blank medium.

Such blank units also possess a set of volume descripter elements, some or all of which can be encrypted as described above to ensure that the units can only be read/recorded on in the presence of the stored key and, if desired, in one or a selected number of readers. In this way, protection can be afforded against unauthorised copies of the ultimately recorded work that is stored in non-encrypted form on the recording medium.

Accordingly, whilst the term <<reader>> is used in the text to generally refer to devices capable of reading pre-recorded digital data, it is also to be understood to include devices capable of writing or recording digital data onto the support medium in those embodiments where recordal of such data is carried out.

In one embodiment the present invention extends to a method of restricting access to recorded digital data, in which the data is audio and/or visual data. However, as will be appreciated, the invention may equally be applied to the protection of computer processed data.

The present invention equally extends to a method of manufacturing a digital support medium and integrated circuit, for example as incorporated in a smart card, for use in the method of the present invention.

Figure 2:
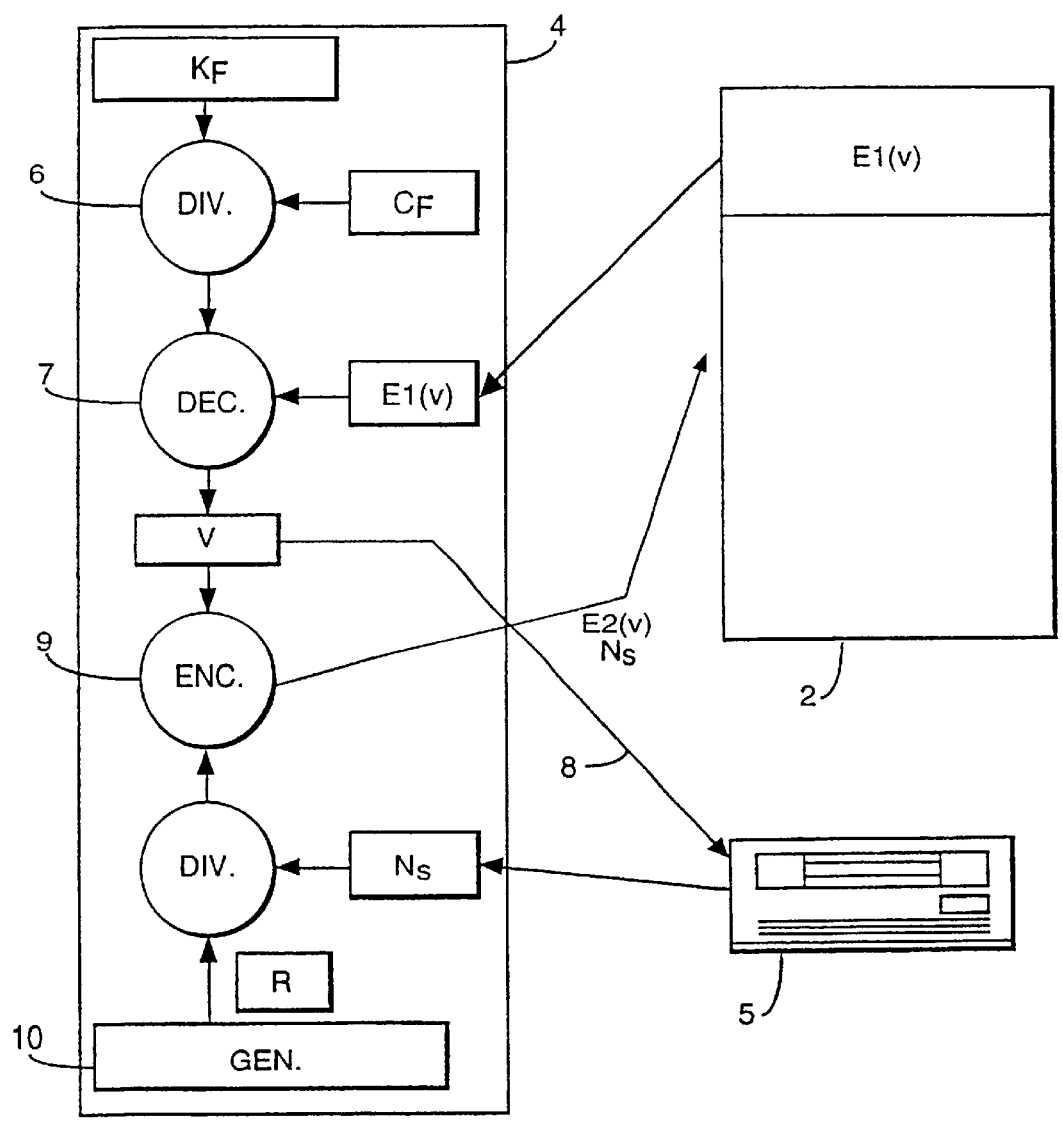

A preferred embodiment of the invention will now be described by way of example only and in relation to the attached figures, in which:

FIG. 1 represents the steps in the creation of digital support medium, in this case a CD ROM, including an at least partially encrypted volume descripter and a smart card containing the decryption key; and FIG. 2 represents the steps carried out in the reading of the digital support medium encrypted as per FIG. 1.

Referring to FIG. 1, the steps in the manufacture of a digital recording including an encrypted volume descripter are shown. A first encryption key Kf is obtained and diversified at step 1 by a manufacturing constant Cf to derive a <<unique>> key associated with the recording in question. The encryption key Kf can be obtained from from any standard symmetric encryption algorithm known to one skilled in the art such as DES, for example.

The manufacturing constant Cf can be chosen from a number of values associated with the recording in question, including the serial number of the recording medium, for example. However, in a simplified embodiment, the manufacturing constant Cf can represent a batch number associated with the production of a batch of CD-ROMs, or even a serial number corresponding to the catalogue number of a film, musical performance etc recorded on the CD-ROM.

In the latter case, the same digital key will be generated for all recorded versions of the same performance or of the same film, for example. Although less secure than the realizations in which a manufacturing constant based on the recording medium itself is used (eg the CD ROM serial or batch number) the level of security provided by this embodiment may nevertheless be sufficient for commercial purposes.

The <<unique>> encryption key obtained from the diversification of the first key Kf is then used at step 3 to encrypt one or more elements of the volume descripter V associated with the recording medium in question. As mentioned in the introduction, the use of a volume descripter in the field of digital recordings is a concept well-known in the art. Such a descripter contains a number of elements describing characteristics of the recording (amount of data stored, layout of digital blocks of information in the recording etc) that have to be read and assimilated by the reader before the recording can be played.

The format of the volume descripter for a given digital recording medium (CD, CD ROM, DVD etc) is usually governed by an international standard or norm in order to ensure compatability between different readers. In the case of CD ROMs, for example, the format of the volume descripter is governed by the international standard ISO 9660, to which the reader of the present application is referred.

If desired, all of this information can be encrypted in one embodiment of the present invention. However, since a part of the information in the volume descripter will be effectively invariant for all standardised recordings a more efficient solution may be based on the encryption of only certain elements of the overall volume descripter.

For example, in the case of a CD ROM, the data found at the octet positions 129 to 190 of the volume descripter as defined in table 4 of the standard ISO 9660 may be encrypted. At these positions, the following data is found:

| | |
|---|---|
| 129 to 132 | Size of logic block |
| 133 to 140 | Size of path table |
| 141 to 144 | Position of occurrence of path table of type L |
| 145 to 148 | Position of optional occurrence of path table of type L |
| 149 to 152 | Position of occurrence of path table of type M |
| 153 to 156 | Position of optional occurrence of path table of type M |
| 157 to 190 | Recording of index for the source index |

As will be appreciated, whilst the descripter is here described in relation to a CD ROM disk, the present invention is equally applicable to other formats of digital recordings of audiovisual or multimedia type data including such descripters, such as digital video disks or the like.

Returning to FIG. 1, the selected elements of the volume descripter V are read from the support medium 2 and encrypted at step 3 by the diversified key Kf. The resulting encrypted elements of the volume descripter, designated here by E1(V), are thereafter used to replace the original elements V in the support 2. The support medium thus formed includes unencrypted digital data representing the bulk of the recording in question together with a partially or entirely encrypted volume descripter. As will be clear, the recording cannot be read without an equivalent decryption key.

In order to permit an authorised user to access the data on the support, it is necessary to supply the user with the key Kf and diversifier Cf. In the present embodiment, the values Kf, Cf are stored in the EEPROM of an integrated circuit mounted on a smart card. The smart card is sold with the recording, such that the legitimate user may listen to or watch the recording in question. The process of decryption is described in greater detail below. Without the decryption key, any copies made of the recording are unreadable. As will be understood, the information stored in the smart card cannot be easily copied and any of a number of techniques known from other fields in which smart cards are used (banking, telephone cards etc) can be used to prohibit unauthorised access to the decryption data.

In an alternative embodiment, the key may be stored in an integrated circuit embedded in the body or housing of the digital recording medium. Incorporation of a microprocessor within the housing of a recording medium is a known technique and has been suggested for example in the case of DVHS cassettes where a set of metallic contacts may be provided on an exterior surface of the cassette housing, the contacts leading to an electronic circuit, such as an integrated circuit or chip in the interior of the housing. These contacts may be engaged by a corresponding set of contacts in the receptacle of the recorder to enable communication between the integrated circuit and the video recorder.

Such an embodiment is as equally resistant to unauthorised copying since possession of the physical recording in the form in which it was sold to the user is a necessary condition for playing of the recorded data.

Referring now to FIG. 2, the steps involved in the decryption and subsequent re-encryption of the volume elements V will now be described. As mentioned above, the values of the encryption key Kf and diversifier Cf are stored in an integrated circuit mounted on a smart card 4 associated with the support medium 2. To read the recording, the smart card 4 and support 2 are inserted in the appropriate slots in a reader 5. Smart card readers are well-known and the modification of CD ROM or DVD reader, for example, to include a smart card slot would be a relatively simple step in terms of the manufacturing process.

As in the encryption method of FIG. 1, the key Kf is diversified by the manufacturing constant Cf stored in the smart card 4 at step 6 and the resulting diversified key used at step 7 to decrypt the encrypted elements E1(V) read from the support element 2. The decryption process is carried out within the smart card and the decrypted volume elements V are thereafter supplied at step 8 to the reader 5 so as to permit reading of the recording.

In its simplest embodiment, the encrypted volume elements E1(V) are retained in the support 2 and the same key Kf and constant Cf stored on the card 4 can be used in all future readings of the recording. However, in a preferred embodiment, the decrypted volume elements are thereafter re-encrypted at step 9 to form a new encrypted value E2(V) written onto the support 2 over the initial value E1(M).

The volume elements V are re-encrypted using a key based on a random number R generated by a random or pseudo-random number generator 10 within the integrated circuit of the smart card itself. The random number R is stored in the smart card to permit subsequent decryption of the volume elements at the next reading of the recording. In this way, the present embodiment permits the rapid individualisation of card and recording, even in the case of batch of recordings initially encoded using the same key Kf and diversifier Cf.

In a preferred variation, the random number key is itself diversified at step 11 using a value read from the reader 5, for example its serial number Ns. The diversifier value Ns is stored together with the re-encrypted volume elements E2(V) on the support 2. In this embodiment, the value Ns is stored in the smart card 4 together with the random number R.

At the next reading of the recording, the smart card 2 reads the serial number Ns from the reader 5 together with the values E2(V) and Ns stored on the support 2. Assuming the same values of the serial number Ns are read from the reader 5 and support 2, the smart card then generates the decryption key from the stored random number value R and diversifier Ns to decrypt the volume elements V so as to permit reading of the recording. As before, a new random number is then generated and a new encrypted value of the volume elements generated and written in the support 2.

If the smart card 2 does not read the same values of the serial number Ns from the support 2 and reader 5, this indicates a different reader is now being used to read the recording. Although this may be indicative of an unauthorised or fraudulent use of the recording, it may also simply indicate the user has replaced his reader or has a number of readers.

Thus, whilst the smart card may be simply programmed to reject the value Ns read from the reader and to refuse to decrypt the volume elements, an alternative embodiment is preferred in which a limited number of different readers may access the data. In one such embodiment the card is programmed such that, in the event of a mismatch between the values of the serial number Ns, the serial number read from the support is used to diversify the random key so as to correctly decrypt the volume elements.

Thereafter, the new serial number Ns read from the reader is used to re-encrypt the elements and this new serial number stored together with the re-encrypted volume elements on the support In this embodiment, the new serial number replaces the previous serial number. The card may be programmed by means of a flag or the like to allow only a limited number of exchanges (for example 1 or 2) of the serial number on the support. After this number has been passed the card will refuse all subsequent exchanges, having judged that fraudulent use of the recording is taking place.

In an alternative embodiment, the card may be programmed to store the serial numbers of any new readers in a list in the support. At each reading, the card checks to see if the serial number of the reader corresponds to that of the reader last used, that is, to the reader serial number used to encrypt the volume descriptor at the last recording. If not, the serial number used to encrypt the volume elements at the last reading is read from the support for use in decrypting the volume elements.

The card also checks to see if the serial number of the present reader corresponds to a number already stored in the support. If not, a new <<authorised>> serial number is added to the list. This new serial number is then used to diversify the random number during the re-encryption of the volume elements for the next reading.

Once the list reaches a certain threshold, for example 2 or 3 authorised readers, the card may then refuse to add any further serial numbers to the list and, at the same time, refuse to pass the decrypted volume elements to the decoder. This comparison may even take place before the decryption step, such that the card will refuse to decrypt the volume elements in the event that the reader number is not found on the completed list of authorised readers.

In comparison with the embodiment in which the serial numbers are sequentially written over each other, this embodiment possesses the advantage that a user may pass between any of the readers in the list an unlimited number of times, as may be reasonably demanded by a user without any fraudulent intentions.

Variations on the above described realisations will be apparent to one skilled in the art. For example, while the invention has been described in particular relation to a prerecorded disk or device, it will be clear that the same principles may be applied to blank supports such as blank digital disks or cassettes, since such devices are nevertheless be provided with a volume descripter which may be encrypted in association with a smart card or the like as described above.

At the first insertion of the medium in the disk, the presence of the associated integrated circuit will be necessary in order to decrypt the volume elements before the reader is allowed to record or write any data onto the blank medium. The presence of the integrated circuit will also be obligatory at all future readings of the medium so as to prevent the unlimited copying of any information eventually recorded on the medium.

As before, the decrypted volume descripter elements may be re-encrypted and re-recorded on the support, for example, using a randomly generated key, and taking into account any changes to the information contained in the volume descripter elements related to the change in composition of the support, for example, from a blank unit to a recorded unit or between two consecutive recordings made on the support.

What is claimed is:

1. A method of restricting access to recorded digital data on a support medium using an integrated circuit associated with the support medium containing a first decryption key, comprising:

encrypting one or more elements of a volume descriptor of the support medium with a corresponding encryption key;

recording the encrypted one or more elements of the volume descriptor describing characteristics of non-encrypted data together with said non-encrypted data on the support medium; and when accessing the support medium, using the first decryption key of the integrated circuit associated with the support medium to decrypt the encrypted one or more elements of the volume descriptor and supply a reader with the decrypted one or more elements of the volume descriptor so as to permit reading and/or writing of the non-encrypted data on the support medium, re-encrypting the volume elements by the integrated circuit according to a new key generated and stored in the integrated circuit, and recording the re-encrypted volume elements on the medium by the reader, replacing the previously encrypted values, wherein the integrated circuit and the support medium are removable from the reader.

2. The method of restricting access to recorded digital data as claimed in claim 1 in which the integrated circuit is embedded in a smart card, the smart card acting to decrypt the encrypted volume elements and to pass the encrypted volume elements to the reader so as to permit reading and/or writing of the recorded data.

3. The method of restricting access to recorded digital data as claimed in claim 1 in which the first key is stored in the integrated circuit that is embedded in the housing of the support medium.

4. The method of restricting access to recorded digital data as claimed in claim 1 in which the first key comprises a key diversified by a manufacturing constant representing a value associated with the identity of the support medium or the recorded data.

5. The method of restricting access to recorded digital data as claimed in claim 1 in which the first key is usable with a symmetric encryption algorithm.

6. The method of restricting access to recorded digital data as claimed in claim 1 in which the new key is generated by a random or psuedo-random number generator in the integrated circuit.

7. The method of restricting access to recorded digital data as claimed in claim 1 in which the new key generated by the integrated circuit is diversified by a value associated with the identity of the reader read by the integrated circuit from the reader.

8. The method of restricting access to recorded digital data as claimed in claim 7 in which the integrated circuit compares a first reader identity value stored on the support medium with a second reader identity read from the reader and, in the event of a difference between the first reader identity and the second reader identity, decrypts the volume elements using the first reader identity value from the support medium and thereafter re-encrypts the volume elements using the second reader identity value taken from the reader.

9. The method of restricting access to recorded digital data as claimed in claim 8 in which the new reader identity value replaces the previous reader identity value stored on the support medium, wherein only a pre-determined number of replacements of the identity value are permitted.

10. The method of restricting access to recorded digital data as claimed in claim 8 in which the new reader identity value is stored in a list of authorized readers on the support medium, wherein only a pre-determined number of readers allowed in the list.

11. The method of restricting access to recorded digital data as claimed in claim 1 in which the support medium is pre-recorded with non-encrypted digital data.

12. The method of restricting access to recorded digital data as claimed in claim 1 in which the support medium is blank prior to its first insertion in the reader, the presence of the integrated circuit being necessary in order to decrypt the volume elements before the reader is allowed to write any data onto the blank medium.

13. The method of restricting access to recorded digital data as claimed in claim 1 in which the data comprises audiovisual data.

14. A method of manufacturing a support medium with an integrated circuit associated with the support medium, the support medium being conditionally accessible by a reader, the method comprising:

encrypting one or more of the elements of a volume descriptor associated with the support medium by means of a first key; and storing an equivalent of the first key necessary to decrypt the one or more elements of the volume descriptor describing characteristics of non-encrypted data on the integrated circuit associated with the support medium, wherein the integrated circuit is embedded in the housing of the support medium and the support medium removable from the reader.

15. A method of restricting access to recorded digital data on a support medium using an integrated circuit associated with the support medium containing a first decryption key diversified by a manufacturing constant representing a value associated with the identity of the support medium or the recorded data, comprising:

encrypting one or more elements of a volume descriptor of the support medium with a corresponding encryption key;

recording the encrypted one or more elements of the volume descriptor describing characteristics of non-encrypted data together with said non-encrypted data on the support medium; and when accessing the support medium, using the first decryption key of the integrated circuit associated with the support medium to decrypt the encrypted one or more elements of the volume descriptor and supply a reader with the decrypted one or more elements of the volume descriptor so as to permit reading and/or writing of the non-encrypted data on the support medium, wherein the integrated circuit and the support medium are removable from the reader.

16. The method of restricting access to recorded digital data as claimed claim 15 in which the volume elements are re-encrypted by the integrated circuit according to a new key generated and stored in the integrated circuit, the encrypted volume elements being thereafter recorded on the medium by the reader, replacing the previously encrypted values.

* * * * *

UNITED STATES PATENT AND TRADEMARK OFFICE
CERTIFICATE OF CORRECTION

PATENT NO.    : 6,813,709 B1
DATED         : November 2, 2004
INVENTOR(S)   : Christian Bernardeau It is certified that error appears in the above-identified patent and that said Letters Patent is hereby corrected as shown below:

<u>Column 10,</u>
Line 13, please insert the word -- is -- in between the words "medium" and "removable".

Signed and Sealed this

Fifth Day of April, 2005

JON W. DUDAS
*Director of the United States Patent and Trademark Office*